United States Patent [19]

Sauder

[11] Patent Number: 4,973,187
[45] Date of Patent: Nov. 27, 1990

[54] FURNITURE ASSEMBLY

[75] Inventor: Myrl D. Sauder, Archbold, Ohio

[73] Assignee: Sauder Woodworking Co., Archbold, Ohio

[21] Appl. No.: 399,998

[22] Filed: Aug. 29, 1989

Related U.S. Application Data

[63] Continuation of Ser. No. 937,742, Dec. 4, 1986, abandoned.

[51] Int. Cl.⁵ .............................................. F16B 12/24
[52] U.S. Cl. .................................... 403/205; 403/231; 403/294; 403/382; 403/403
[58] Field of Search ............... 403/403, 382, 231, 205, 403/363, 375, 405.1–407.1, 409.1, 402, 295, 381, 401, 294; 52/285, 776, 775; 248/220.1, 188

[56] References Cited

U.S. PATENT DOCUMENTS

| | | |
|---|---|---|
| 2,605,158 | 7/1952 | Nash . |
| 3,204,905 | 9/1965 | Marban . |
| 3,409,258 | 11/1968 | Carlson . |
| 3,510,985 | 5/1970 | Smits ............................. 403/295 X |
| 3,944,377 | 3/1976 | Defrese . |
| 3,999,878 | 12/1976 | Robinson . |
| 4,014,618 | 3/1977 | Kristiansen . |
| 4,032,242 | 6/1977 | Morris . |
| 4,060,949 | 12/1977 | Busse . |
| 4,161,977 | 7/1979 | Baslow .......................... 403/401 X |
| 4,469,466 | 9/1984 | Hotz . |
| 4,477,201 | 10/1984 | Yoshiyuji . |
| 4,589,792 | 5/1986 | Niziol . |
| 4,642,957 | 2/1987 | Edwards . |
| 4,712,942 | 12/1987 | Brown . |
| 4,740,098 | 4/1988 | Witt . |

*Primary Examiner*—Peter M. Cuomo
*Attorney, Agent, or Firm*—Emch, Schaffer, Schaub & Porcello Co.

[57] ABSTRACT

The disclosure relates to a furniture assembly having first and second components joined at right angles. The interior face of one of the components defines a groove which extends parallel to the line of intersection of the components. The groove serves as a "pilot hole" for fasteners which secure one or more brackets to each component. In one embodiment, the bracket includes perpendicular legs. An outwardly extending tongue is defined by one of the legs and is received in the groove. Gussets extend between the legs on opposite sides of the bracket.

13 Claims, 2 Drawing Sheets

U.S. Patent    Nov. 27, 1990    Sheet 1 of 2    4,973,187
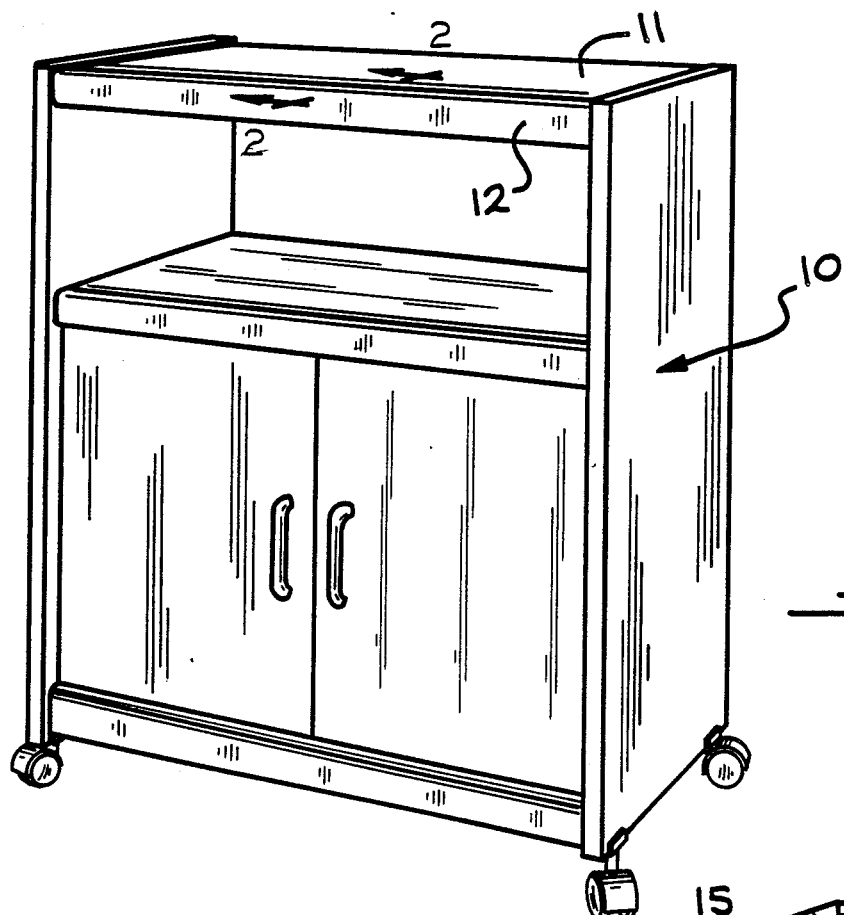
FIG. 1
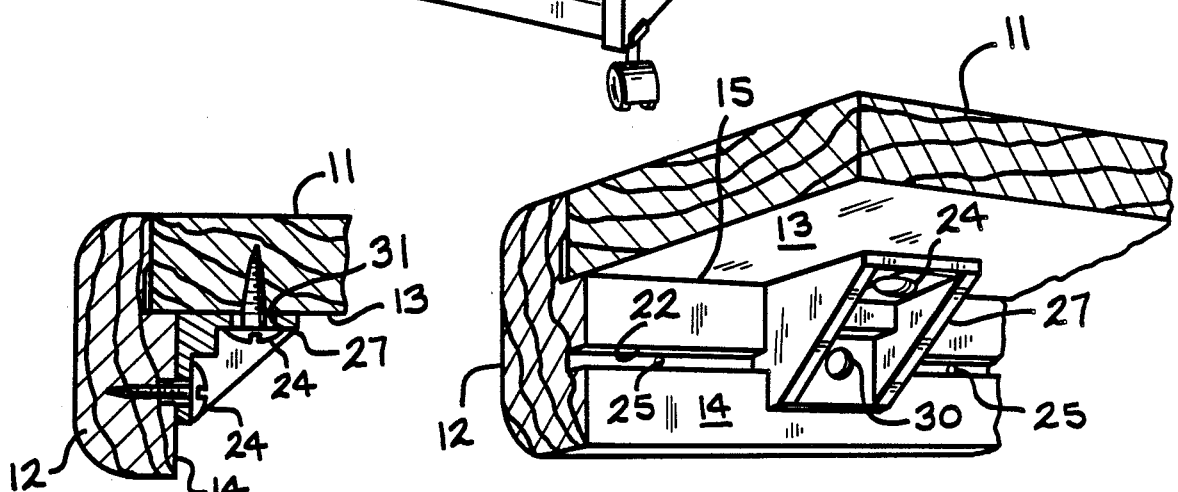
FIG. 2
FIG. 3
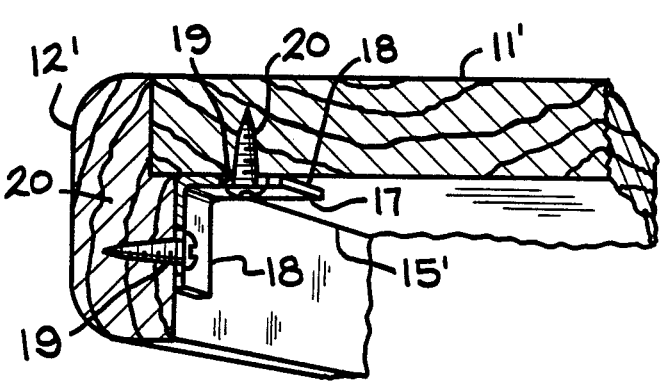
FIG. 4  PRIOR ART

FURNITURE ASSEMBLY

This is a continuation of copending application Ser. No. 06/937,742 filed on Dec. 4, 1986, now abandoned.

BACKGROUND OF THE INVENTION

The present invention relates to a furniture assembly which is adaptable to furniture in general and specifically to ready-to-assemble furniture.

In many types of furniture assemblies and in particular ready-to-assemble furniture, when two perpendicular components are joined together, this is often done by using 90° brackets. Often these brackets are metal brackets having perpendicular legs, each of which define an opening. Fasteners, such as screws, are then used to connect the brackets to the furniture components to join the furniture components together. However, in ready-to-assembly furniture, the screw holes must be defined. Often holes are drilled by the manufacturer at pre-arranged locations along the edge of the individual furniture components. This results in considerable labor and the need for relatively careful positioning. If the holes are drilled incorrectly, the consumer has difficulty in assembling the furniture components because of the misalignment of the individual holes.

In addition, the prior art metal brackets or clips can sometimes be bent if a force is placed on one of the furniture components. This leaves a joint which is either misaligned or includes an unsightly gap.

The primary object of the present invention is to provide a furniture assembly in which an alignment groove is defined in one of the furniture components. The alignment groove is used as a pilot hole for fasteners, such as screws, during assembly.

Another object of the present invention is to provide a furniture assembly having a bracket which has sufficient strength and which includes a depending projection which may be positioned in the alignment groove to ensure a correct alignment of the components.

SUMMARY OF THE INVENTION

The present invention relates to a furniture assembly which has first and second furniture components positioned at generally right angles to one another. The furniture components define intersecting interior surfaces. One of the components has a longitudinally extending groove which extends parallel to the interior surface of the other component and which is spaced from the intersection of the interior surfaces of the components.

A bracket having perpendicular legs is mounted adjacent the intersecting interior surfaces. The bracket defines openings in the legs for receiving fasteners which extend through the openings. One of the fasteners of one of the legs is received in the groove which acts as a pilot hole and as an alignment means.

Preferably the bracket is constructed of a plastic material and includes gussets extending between the legs on opposites sides of the bracket. One of the legs of the bracket also includes a tongue means which extends into the groove, defined by the furniture component, to provide the proper alignment.

DESCRIPTION OF THE DRAWINGS

FIG. 1 is a perspective view of a ready-to-assembly utility cart which includes two components joined together at right angles to one another;

FIG. 2 is a fragmentary, enlarged view taken along the line 2—2 of FIG. 1 showing the two furniture components and showing a bracket holding the components together;

FIG. 3 is a fragmentary perspective view, similar to FIG. 2 and showing a preferred bracket and furniture assembly having a longitudinally extending alignment groove;

FIG. 4 is a view similar to FIG. 2 showing a prior art furniture assembly joined together with a metal bracket and two screws which are positioned in holes in the bracket legs;

DETAILED DESCRIPTION OF THE PREFERRED EMBODIMENTS

Figure 5:
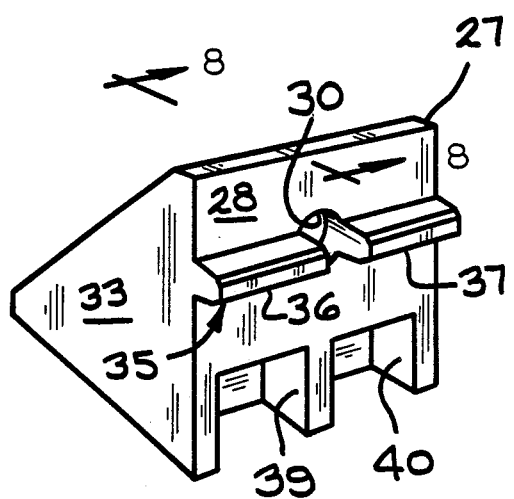
FIG. 5 is a rear perspective view of a bracket, according to the present invention.

A ready-to-assemble utility cart 10 is shown in FIG. 1. The cart 10 includes a furniture assembly comprising a first component or top 11 and a second component or molding strip 12. Referring to FIG. 3, the top 11 and molding strip 12 are positioned at generally right angles to one another and include intersecting interior surfaces 13 and 14. A line of intersection is indicated in FIG. 3 by the reference number 15.

Referring to FIG. 4, in prior art construction, a top 11' was ofter joined to a molding strip 12' by the use of a plurality of metal brackets 17. The metal brackets 17 included perpendicularly extending legs 18 which defined openings 19. The openings 19 received fasteners such as screws 20. The prior art furniture assembly shown in FIG. 4 presents problems. First, screw holes must be carefully drilled at the manufacturer's factory. The holes must be on a line which is parallel to the line of intersection 15' and also must be positioned correctly along such parallel line so that the individual openings 19 in the bracket legs 18 are aligned with the two previously drilled holes in the two furniture components 11' and 12'. If the holes are not correctly aligned the two components will be spaced incorrectly. In the present utility cart example, this either results in a gap between the top 11 and the molding strip 12 or a situation where the top 11 extends above the molding strip 12 thereby presenting an unsightly ridge.

Referring to FIG. 3, a primary feature of the present invention is shown. This feature is a longitudinally extending groove 22 which extends parallel to the interior surface 13 of the top 11 and also parallel to the line of intersection 15. The groove 22 is defined in the interior surface 14 of the molding strip 12. The groove 22 has two important functions. First, it serves as a "pilot hole" for fasteners such as screws 24. If desired, locating holes 25 may be drilled in the bottom of the groove 22 to serve as guides for the screws 24. The tip of the screws 24 are received by the guide holes 25. Secondly, when a bracket such as a preferred bracket 27 is utilized, the bracket 27 mates with the groove 22 to assure alignment of the furniture components 11 and 12.

Referring to FIGS. 5–8, a preferred bracket 27 is formed as an integral member. The bracket 27 is preferably constructed of a plastic material such as a styrene material or a nylon material. It has been found that an injection molded styrene bracket provides a sturdy component for a furniture assembly according to the present invention. The bracket 27 includes perpendicular legs 28 and 29 which are generally perpendicular to one another. The leg 28 defines an opening 30 while the leg 29 defines an opening 31. The opening 30, in the present embodiment, comprises a circular hole, while the opening 31 comprises an elongated slot. The openings 30 and 31 receive fasteners such as the screws 24 as shown in FIGS. 2 and 3. A pair of integral gussets 32 and 33 extend between the legs 28 and 29 adjacent the opposite sides of the bracket 27. The gussets 32 and 33 reinforce the overall bracket 27. It has been found that a bracket such as the metal bracket 17, shown in FIG. 4, has a tendency to flex or bend, sometimes leaving an unsightly gap between the furniture components 11' and 12'. The bracket 27 eliminates this problem.

A tongue means 35 extends from the bottom of the leg 28. In the present embodiment, the tongue means 35 comprises a pair of aligned projections 36 and 37 which are separated by the opening 30. It is understood that in other embodiments the tongue means 35 may be a continuous member or a plurality of aligned projections. The important consideration is that the tongue means 35 must be complimentary in shape with the groove 22. The tongue means 35 is received by the groove 22 and serves to align the top 11 and molding strip 12 in their correct relationship with one another. Referring to FIG. 5, the bracket 27 defines a pair of recesses 39 and 40 at the back of the bracket 27 adjacent the intersection of the legs 28 and 29.

Figure 6:
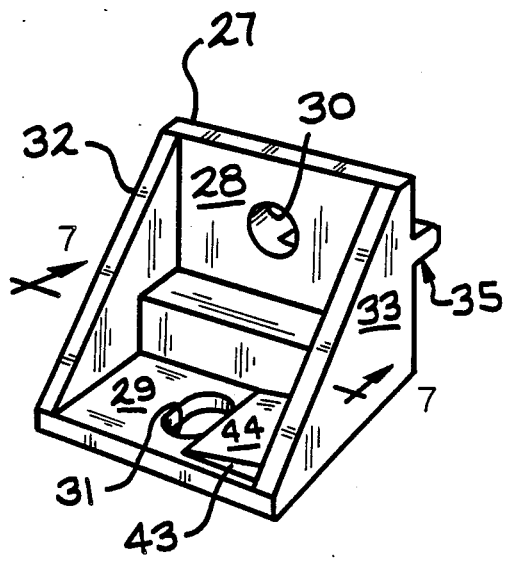
FIG. 6 is a view similar to FIG. 5 showing a front perspective view of the bracket.
Figure 7:
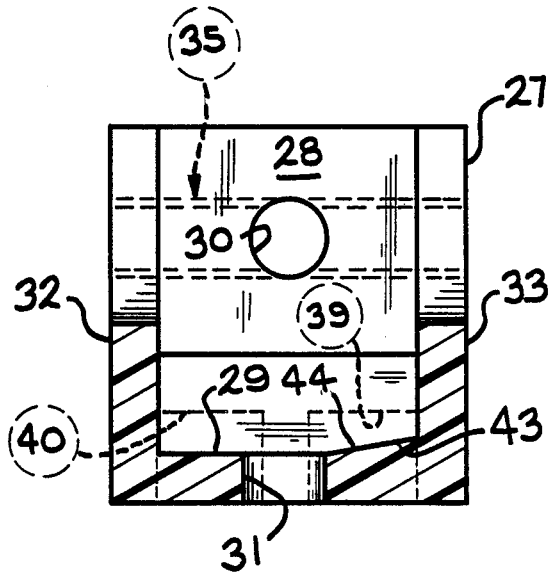
FIG. 7 is an enlarged sectional view taken along the line 7—7 of FIG. 6.
Figure 8:
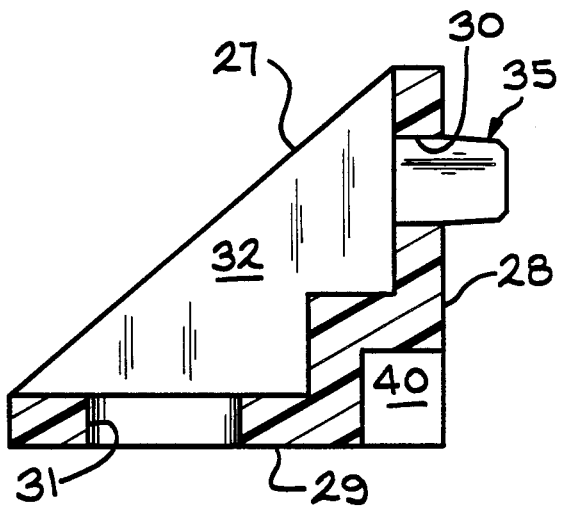
FIG. 8 is an enlarged sectional view taken along the line 8—8 of FIG. 5.

Referring to FIGS. 6 and 7, in a preferred embodiment of the bracket 27, a wedge member 43 extends from the opening 31 in the leg 29 upwardly and outwardly toward the gusset 33. The wedge member 43 defines a wedging surface 44. During assembly of a furniture assembly as a screw 24 is rotated the head of the screw engages the wedging surface 44 of the wedge member 43. This draws the furniture components 11 and 12 into a tight relationship with one another.

It has been found that the furniture assembly, according to the present invention, can be used in factory made furniture as well as ready-to-assembly furniture. Even in ready-to-assembly furniture, there is flexibility in the use. For example, in some applications, the bracket 27 may be attached by a screw 24 only to one of the furniture components prior to leaving the factory. An example of this is shown in FIG. 3. Upon assembly, the consumer merely places the molding strip 12 against the top 11 making sure that the tongue member 35 is correctly engaged in the groove 22. After correct alignment is completed, another screw 24 is placed in the opening 30 and the assembly completed. In still other methods of assembly, the brackets 27 are not connected to either of the two furniture components 11 or 12 but are placed in proper position by the ultimate consumer.

It is understood that many modifications and changes may be made to the present furniture assembly without departing from the scope of the following claims.

What I claim is:

1. A furniture assembly having first and second components positioned at right angles to one another, said components defining intersecting and perpendicular interior surfaces, said second component having a longitudinally extending pilot groove within its interior surface and extending along such interior surface and parallel to said intersection of such interior surfaces of said first and second components, said longitudinally extending pilot groove being spaced from said intersection of such interior surfaces, a bracket having perpendicular legs mounted adjacent such intersecting and perpendicular interior surfaces, said bracket defining at least one opening for receiving a fastener which extends through such opening into such parallel longitudinally extending pilot groove defined by said second component, whereby when said bracket is positioned adjacent to said interior surfaces of said components said fastener extends into said longitudinally extending pilot groove.

2. A furniture assembly having first and second components positioned at right angles to one another, said components defining intersecting and perpendicular interior surfaces, said second component having a longitudinally extending pilot groove within its interior surface and extending along such interior surface and parallel to said intersection of such interior surfaces of said first and second components, said longitudinally extending pilot groove being spaced from said intersection of such interior surfaces, a bracket having perpendicular legs mounted adjacent such intersecting and perpendicular interior surfaces, said bracket defining at least one opening for receiving a fastener which extends through such opening into such parallel longitudinally extending pilot groove defined by said second component, said bracket further defining outwardly extending tongue means received in said pilot groove for aligning such components, whereby when said bracket is positioned adjacent to said interior surfaces of said components said fastener and said tongue means extend into said pilot groove to properly align said components.

3. A furniture assembly, according to claim 2, wherein said tongue means comprises a pair of projections extending from opposite sides of such opening.

4. A furniture assembly, according to claim 2, wherein one of said perpendicular legs defines such opening, said other leg defining a second opening.

5. A furniture assembly, according to claim 4, wherein said second opening comprises an elongated slot.

6. A furniture assembly, according to claim 4, including gusset plates extending between said perpendicular legs of said bracket.

7. A furniture assembly, according to claim 6, including a wedge member positioned on said other leg adjacent such second opening, wherein engagement of a fastener and said wedge member urges said components to a tight relationship.

8. An improved bracket for use in joining together a furniture assembly having first and second components positioned at right angles to one another, said components defining intersecting and perpendicular interior surfaces, one of said components having a longitudinally extending pilot groove extending along such interior surface and parallel to the intersection of the interior surfaces of said first and second components, said longitudinally extending pilot groove being spaced from the intersection of the components, said bracket comprising integral perpendicular legs, said legs each having a front surface, a rear surface and opposed side edges, said legs each defining an opening for receiving a fastener, one of said leg openings receiving a fastener which extends into the longitudinally extending pilot groove, and a pair of integral gussets extending between said legs adjacent the opposed side edges, wherein each of said legs has an adjoining edge and a free edge, said gussets extending from the adjoining edges to said free edges, tongue means extending outwardly from the rear surface of one of said legs, whereby when said bracket is positioned adjacent to said components, said fastener and said tongue means extend into said pilot groove to properly align said components.

9. An improved bracket, according to claim 8, wherein said bracket is constructed of a plastic material.

10. An improved bracket, according to claim 8, wherein said tongue means comprises a pair of projections extending from opposite sides of such opening in said one of the leg openings, said projections being received in said pilot groove.

11. An improved bracket, according to claim 8, including a wedge member positioned on one of said legs adjacent an opening, wherein engagement of a fastener and said wedge member urges said components tightly together.

12. An improved bracket, according to claim 8, including at least one recess defined in the rear surface of said bracket adjacent the intersection of said legs.

13. An improved bracket, according to claim 8, wherein such opening in said one of the leg openings is a circular hole and such opening in the other of said legs is an elongated slot.

* * * * *